Oct. 22, 1957  M. M. NYBORG  2,810,168
APPARATUS FOR HANDLING FUSIBLE MATERIALS
Filed April 15, 1957
2 Sheets-Sheet 1
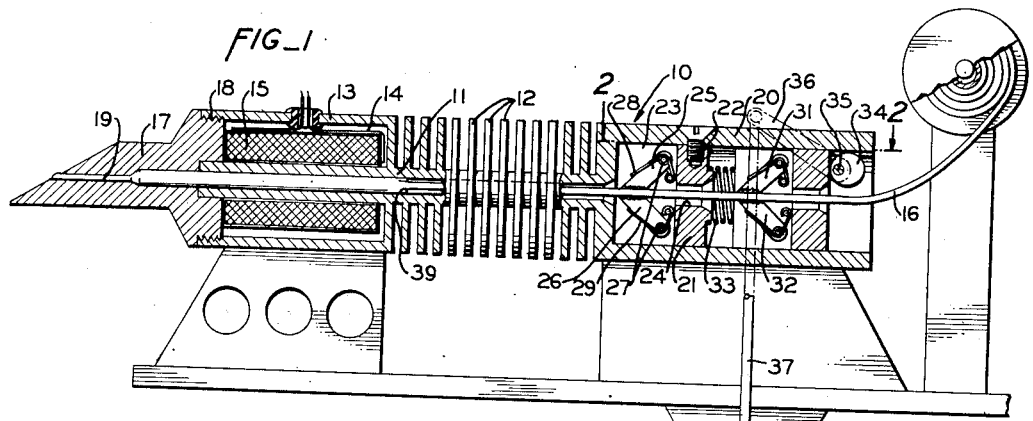
FIG_1
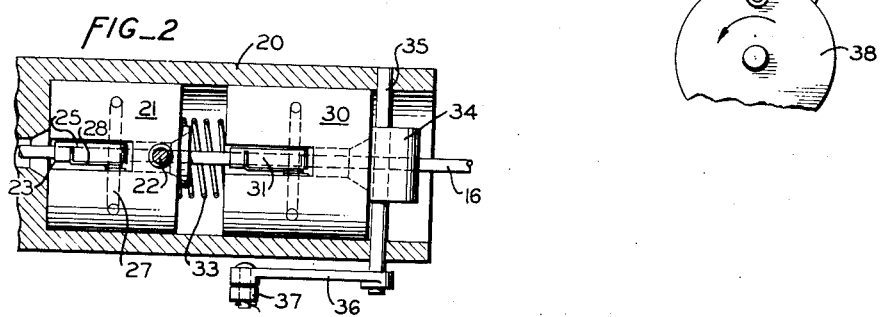
FIG_2
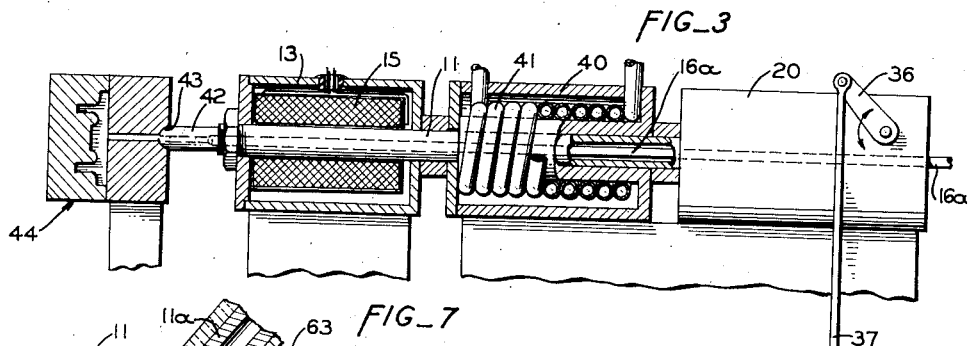
FIG_3
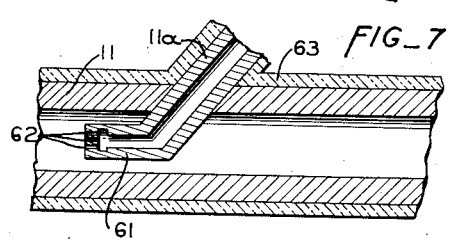
FIG_7
INVENTOR.
MEREDITH M. NYBORG
BY
Mellin and Hanscom
ATTORNEYS

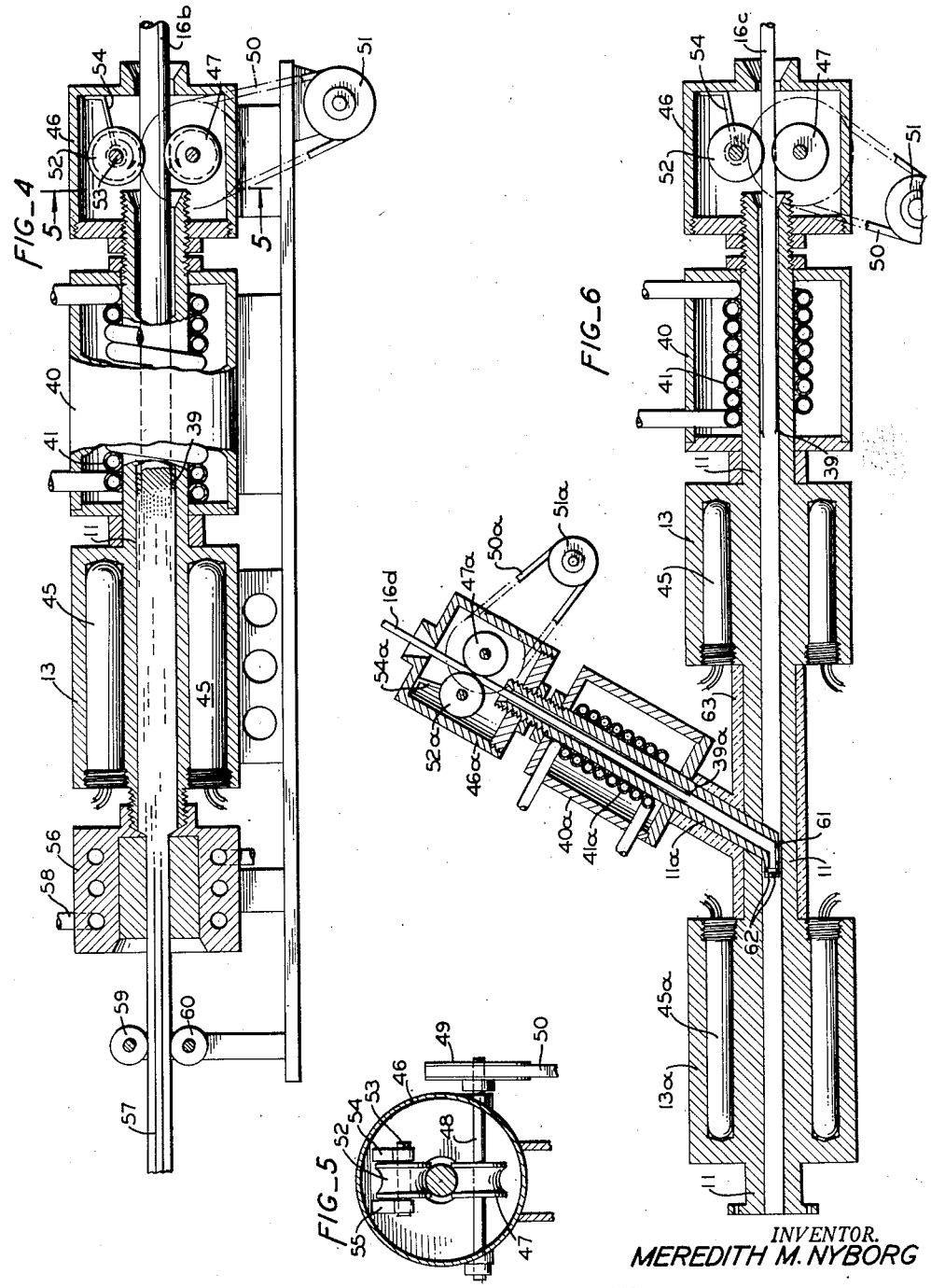

United States Patent Office 2,810,168
Patented Oct. 22, 1957

2,810,168

APPARATUS FOR HANDLING FUSIBLE MATERIALS

Meredith M. Nyborg, Camarillo, Calif.

Application April 15, 1957, Serial No. 653,033

5 Claims. (Cl. 22—57.2)

This invention relates to the art of handling fusible materials and is a continuation-in-part application of my copending application, Serial No. 498,835, filed April 4, 1955, now abandoned. More particularly, the invention is directed to an apparatus for the dispensing of molten fusible materials either continuously at a desired rate or intermittently in measured quantities through a discharge orifice.

It is the principal object of this invention to provide an apparatus wherein fusible material may be fed into said apparatus in either rod or wire form, and discharged therefrom in a molten state either continuously at desired rates or intermittently in measured quantities.

A further object of the invention is to provide an apparatus according to the preceding object, wherein the material in rod or wire form is fed through a temperature gradient tube, the discharge end of which is maintained at a higher temperature than the melting point of the material being handled, and the other end of which is maintained at a temperature below the melting point of said material; and wherein the rod or wire of material is smaller in external diameter than the internal diameter of said gradient tube, whereby the molten material backflowing around said rod or wire of material resolidifies around said rod upon reaching the cooled portion of said tube to form a plug or continuously reforming seal. The plug or seal performs the double function of preventing air from reaching the molten material in said gradient tube, and acting as a plunger to aid in the forcing of the molten material from the forward end of the tube as the rod of material is advanced therethrough.

A still further object of the invention is to provide an apparatus according to either of the preceding objects, wherein the discharge end of said tube is connected to a soldering tip having a restricted orifice passage therethrough, and wherein an intermittent feed mechanism is incorporated in said apparatus to permit feeding of the material handled in desired quantities.

Another object is to provide an apparatus according to the immediately preceding object wherein the soldering tip is replaced by a mold into which fusible material can be cast under pressure.

Still another object of the invention is to provide an apparatus according to the previous objects, wherein the discharge end of the temperature gradient tube is directly connected to a cooled extrusion die, and the feed mechanism is of the continuous feed type.

A further object of the invention is to provide two or more apparatuses according to the preceding objects, each provided with a continuous feed mechanism, wherein the discharge of each of the gradient tubes is connected to a common heated plenum chamber to permit continuous alloying by feeding dissimilar materials through the two or more tubes to mix in the plenum chamber and discharge therefrom in alloy form.

The preferred forms of the invention are described in the following detailed specification and illustrated by way of example in the accompanying drawings, wherein:

Fig. 1 is a sectional view of a soldering device embodying the principles of the invention.

Fig. 2 is a sectional view taken on line 2—2 of Fig. 1.

Fig. 3 is a modification of the device shown in Fig. 1 and shows the invention applied to a mold for making castings.

Fig. 4 is a further modification illustrating a modified form of feeding mechanism and shows the invention applied to an extrusion die.

Fig. 5 is a sectional view taken on line 5—5 of Fig. 4.

Fig. 6 is a further modification of the structure shown in Fig. 4, showing the invention applied to a continuous alloy forming apparatus.

Fig. 7 is a fragmentary view drawn to an enlarged scale illustrating the junction between the two gradient tubes shown in Fig. 6.

Referring now to the drawings, and more particularly to Fig. 1 thereof, 10 designates generally a soldering apparatus comprising a hollow tube 11, hereinafter referred to as the temperature gradient tube, having a plurality of cooling fins 12 formed integrally therewith adjacent the rear end thereof. A cylindrical housing 13, closed at its rearmost end, surrounds the forward end of the gradient tube 11, and is spaced therefrom to define an annular chamber 14. A heating coil 15 is received in the annular chamber 14, and is adapted to maintain the forward end of the gradient tube 11 at a temperature above the melting point of the solder 16 being fed therethrough. The internal cross-sectional area of the gradient tube 11 is greater than the cross-sectional area of the solder wire 16. A soldering tip 17 is threaded into the forward end of the housing 13, in the manner indicated at 18, and encompasses the forward end of the gradient tube 11. A restricted passageway 19 extends longitudinally through the soldering tip 17 and communicates with the bore of the gradient tube 11. The passageway 19 has a cross-sectional area smaller than the cross-sectional area of the solder wire 16.

A feed mechanism housing 20 is formed integrally with an extends rearwardly from the rear end of the gradient tube 11. A first cylindrical block 21 is mounted within the forward end of the housing 20 and held stationarily therein by a set screw 22. As can best be seen in Fig. 2, a vertical slot 23 is cut into the forward end of the block 21, and a central bore 24 extends through the block longitudinally to permit the passage therethrough of the wire of solder 16. A pair of holding jaws 25 and 26 are each pivotally mounted within the slot 23 on suitable pivot pins 27 extending transversely of the slot. The jaws 25 and 26 are mounted one above and one below the central bore 24 with their free ends extending forwardly. The free ends are urged together into gripping engagement with the wire of solder 16 by suitable coil torsion springs 28 and 29, respectively. Thus, it can be seen that the wire of solder 16 can pass freely forwardly between the jaws 25 and 26, but is prevented from passing rearwardly therebetween.

A second cylindrical block 30, similar in all respects to the block 21, is slidably received within the housing 20 rearwardly of the block 21. The block 30 has mounted therein gripping jaws 31 and 32, whereby rearward movement of the block 30 permits the jaws to move relative to the wire of solder 16, and forward movement of the block 30 advances the wire of solder 16. A compression spring 33 is interposed between the blocks 21 and 30 and urges the block 30 rearwardly against an eccentric cam block 34. The eccentric cam block 34 is mounted on a shaft 35 extending transversely of and rotatably supported by the housing 20 rearwardly of the block 30. A crank arm 36 is secured to one end of the shaft 35 and an actuating rod 37 is connected to the free end thereof. Movement of the actuating rod; for example, by the crank mechanism shown schematically at 38, will cause the eccentric cam block 34 to move the block 30 forwardly and rearwardly to advance the wire of solder 16 through the soldering apparatus 10 in step by step increments. It is obvious that the actuating rod 37 could be actuated by a foot or hand lever instead of the specific structure shown.

In the operation of the soldering apparatus shown in Figs. 1 and 2, the tip 17 and the portion of the gradient tube 11 within the coil 15 are maintained at a temperature above the melting point of the solder 16. The portion of the gradient tube 11 within the cooling fins 12 is cooled by radiation from the fins, and is thereby maintained at a temperature below the melting point of the solder 16. The wire of solder 16 is fed into the rear end of the feeding mechanism, and the actuating rod 37 is actuated to advance the wire of solder 16 through the apparatus. When the solder reaches the portion of the tube 11 within the coil 15, the solder melts. The actuating rod 37 is actuated until this portion of the tube 11 and the passage 19 through the soldering tip 17 is completely filled with molten solder. Since the internal diameter of the gradient tube 11 is larger than the external diameter of the wire of solder 16 and the internal diameter of passageway 19 is smaller than the external diameter of the wire of solder 16, the molten solder tends to flow rearwardly around the wire until it reaches a point in the tube 11 where the temperature is below the melting point. At this point the solder will resolidify around the wire of solder and form a plug in the manner indicated at 39. This may best be seen in Fig. 4, which figure will be more fully described hereinafter. The plug so formed performs the double function of preventing air from reaching the molten metal through the rear of the gradient tube 11, and also acts as a plunger to aid in forcing the molten solder through the restricted passage 19, when the wire of solder 16 is advanced by actuation of the rod 37. The word solder as used herein embraces not only the common soft solders (alloys of tin and lead) but also hard solders containing silver, copper, etc., and having working temperatures above 1000° F.

It has been found that the successful operation of the soldering apparatus depends to a large extent on the smoothness of the inner wall of the gradient tube 11. If the inner wall surface has any imperfections, such as pits, scratches, abrasions, or the like, the backflowing solder will flow within such imperfections and solidify therein so as to prevent easy forward movement of the solder wire 16 and plug 39. If such imperfections are sufficiently large, the resolidified plug 39 will be so locked into place within the imperfections that any forward movement of the solder wire 16 will be prevented. It is thus apparent that the smoother the inner wall of gradient tube 11 is made, the less resistance to forward movement of the resolidified plug 39 there will be. Accordingly, it is desirable to provide a polished inner surface, as free from discontinuities as possible, so as to overcome any problems arising from the sticking of plug 39 to the inner wall. The degree of smoothness required will be dependent to some degree upon the stiffness of the fusible rod. That is, if a relatively soft rod is being inserted into the gradient tube, the bore of the tube must be quite smooth to avoid any buckling of the rod if the resolidified plug 39 were to stick. If a relatively stiff rod is used, considerably more force may be used to push the rod through the tube, without the occurrence of buckling. This greater force will cause the resolidified plug to shear off any portion thereof which might have solidified in an imperfection in the bore. Thus, the bore need not be as smooth in this latter case for successful operation of the device, although this operation will be improved if the bore is made more smooth.

Turning now to the modification shown in Fig. 3, the apparatus shown therein is similar to that shown in Figs. 1 and 2 with the exception that the cooling fins 12 have been replaced with a housing 40 containing a cooling coil 41 surrounding the rear portion of the gradient tube 11, and through which any suitable cooling fluid may be circulated. The soldering tip 17 is replaced with a nozzle 42 adapted to be received within a complementary-shaped receiving orifice 43 of a mold 44. In this apparatus the material 16a might be any material suitable for die-casting, such as zinc, or tin, or aluminum-base die-casting alloys, or any thermo-plastic material suitable for injection molding, such as wax, glass, thermo-plastic resin, or the like. Since the amount of advance on each stroke of the actuating rod 37 is known, the amount dispensed from the apparatus into the mold 44 may be accurately controlled within very close limits.

Alternatively, the stroke of the actuating mechanism can be so adjusted that the mold will be filled before the forward stroke is complete, whereby continued pressure may be exerted on the material in the mold while solidification takes place. It is to be noted that the plug of resolidified material 39 effectively seals the annular space between the rod of material 16a and the inner wall of the gradient tube 11 and prevents the escape of the molten material despite the existence of an appreciable pressure therein.

The modification shown in Figs. 4 and 5 shows the invention adapted for use with an extrusion die. In these figures the heating coil 15 is replaced by a plurality of cartridge type heating elements 45, merely to show that other means of heating than the coil 15 may be employed.

The primary difference between the modification shown in Figs. 4 and 5 over that shown in Fig. 3 is in the substitution of a continuous casting die 56 for the mold 44. Another difference is in the feeding mechanism enclosed in the housing 46. In the modification shown in Fig. 3, the feeding mechanism was of the intermittent step-by-step type, whereas the feeding mechanism employed in Figs. 4 and 5 is of the continuous feed type.

The continuous feed mechanism comprises a drive roller 47 keyed or otherwise fastened to a drive shaft 48 rotatably mounted transversely with the housing 46. A belt pulley 49 is keyed to the shaft 48 externally of the housing 46. A belt 50 connects the pulley 49 with a drive pulley 51 driven by a suitable motor and reduction gearing not shown. An idler roller 52 is rotatably mounted in opposition to the drive roller 47 on a shaft 53 supported by two spring arms 54 and 55. The surfaces of the rollers 47 and 52 may be roughened or have yieldable material mounted thereon to insure their frictional grip on the rod 16b. In operation, the idler roller 52 contacts the upper surface of the rod 16b of the material being processed and forces it against the drive roller 47. The rotation of the drive roller thereby advances the rod 16b through the apparatus at a constant rate according to the speed of rotation of the roller 47. In this modification, as the rod 16b is fed into the device, the molten material is forced from the forward end of the gradient tube 11 through a chilled continuous casting die 56 attached thereto to form a rod 57 having a particular cross-sectional configuration determined by the die 56, the material 16b being resolidified as it passes through the die. The die 56 is chilled by a cooling coil 58 embedded therein. The extruded rod is supported by a pair of supporting rolls 59 and 60 through which it passes after leaving the die 56. The rolls 59 and 60 may be power driven to aid in drawing rod 57 from the die 56.

In the continuous alloying apparatus shown in Fig. 6, the main apparatus (shown in the lower portion of the figure) is the same as that shown and described with respect to Fig. 4. Instead of the die 56, however, the main gradient tube 11 is extended forwardly and a second heating element housing 13a and set of heating cartridges 45a are mounted therearound at a point spaced from the primary heating elements 45. An auxiliary gradient tube 11a is connected to the primary tube 11 intermediate the two heating zones. As can best be seen in Fig. 7, the auxiliary gradient tube 11a extends into the main gradient tube 11 and terminates in a nozzle 61 extending coaxially thereof. The nozzle 61 is provided with a plurality of restricted orifices 62 through which the alloy material flows. The portion of the main gradient tube 11 between the heating chambers 13 and 13a and the portion of the auxiliary gradient tube 11a between the cooling chamber housing 40 and the junction between the two gradient tubes are each surrounded by heat insulating material 63. The auxiliary gradient tube 11a is provided with a cooling coil 41a and a continuous feeding mechanism similar to the feeding mechanism of the main tube 11 and designated by the same reference numerals with the postscript "a."

In the operation of the apparatus shown in Fig. 6, a rod 16c of one type of material is fed continuously through the main gradient tube 11 and is maintained in a molten state forwardly from the heating chamber represented by the housing 13. A rod 16d of different material is fed through the auxiliary gradient tube 11a, and is melted by contact with the molten primary material. The two molten materials intermix in the plenum chamber formed by the portion of the gradient tube 11 within the heating element housing 13a, and issue as an alloy from the forward end of the gradient tube 11. By proper correlation of the speed of the drive pulleys 51 and 51a, the composition of the final alloy can be controlled within very close limits. While only one auxiliary gradient tube 11a is shown, it should be understood that a plurality of such tubes could be connected with the main tube 11 in a like manner, and that a different material could be fed through each, thus making possible the mixing of several materials to form complex alloys.

It should be understood that either of the types of heating elements herein disclosed may be used in any of the embodiments set forth, or other heating units, such as a coil adapted to have a heating medium circulated therethrough, or an electromagnetic induction heating unit could be employed.

While I have shown and described several embodiments or applications of my invention, it is to be understood that the invention is not limited to these specific embodiments and that various changes may be therein by those skilled in the art, without departing from the spirit of the invention as defined in the appended claims.

Having thus described my invention, what I claim and desire to secure by Letters Patent is:

1. An apparatus for melting and dispensing a solid rod or wire of fusible material having a substantially constant cross-sectional area comprising a temperature gradient tube having an internal cross-sectional area greater than the external cross-sectional area of said rod, means forming a discharge orifice at one end of said tube, said orifice having a cross-sectional area smaller than the cross-sectional area of said rod, means for maintaining a temperature gradient along said tube with the discharge end of said tube at a temperature higher than the melting point of said rod and the opposite end of said tube at a temperature below the melting point of said rod, means for feeding said rod through said tube toward the discharge end thereof whereby as said rod is fed through said tube the molten part of said rod will be forced to backflow around said rod and resolidify therearound in a continuously reforming seal between said rod and said gradient tube.

2. An apparatus for melting and dispensing a solid rod or wire of fusible material having a substantially constant cross-sectional area comprising a temperature gradient tube having an internal cross-sectional area greater than the external cross-sectional area of said rod, means forming a discharge orifice at one end of said tube, said orifice having a cross-sectional area smaller than the cross-sectional area of said rod, means for heating said one end of said tube to a temperature above the melting point of said fusible rod, means for cooling the opposite end of said tube to a temperature below the melting point of said rod, and means for advancing said rod through said tube toward the discharge end thereof whereby as said rod is advanced through said tube the molten part of said rod will be forced to backflow around said rod and resolidify therearound in a continuously reforming seal between said rod and said gradient tube.

3. A soldering apparatus for use with a rod or wire of solder having a substantially uniform cross section comprising a temperature gradient tube having an internal cross-sectional area greater than the external cross-sectional area of said solder rod, a soldering tip connected to one end of said tube, a discharge orifice in said tip in communication with the bore of said tube, said orifice having a cross-sectional area less than the cross-sectional area of said rod, heating means for maintaining the end of said tube adjacent said soldering tip and said soldering tip above the melting point of said solder rod, means for cooling the opposite end of said tube to a temperature below the melting point of said rod, and means for advancing said rod through said tube toward the discharge end thereof whereby as said rod is advanced through said tube the molten part of said rod will be forced to backflow around said rod and resolidify therearound in a continuously reforming seal between said rod and said gradient tube.

4. An apparatus for producing castings using a fusible rod or wire of substantially constant cross-sectional area of material to be molded comprising a temperature gradient tube having an internal cross-sectional area greater than the external cross-sectional area of said rod, a nozzle connected to one end of said tube, said nozzle being adapted to be received within a complementary shaped receiving orifice and having a discharge orifice in communication with the bore of said tube and of cross-sectional area less than the cross-sectional area of said rod, heating means for maintaining the end of said tube adjacent said nozzle and said nozzle above the melting point of said rod, heating means for maintaining the end of said tube adjacent said nozzle and said nozzle above the melting point of said rod, means for cooling the opposite end of said tube to a temperature below the melting point of said rod, and means for advancing said rod through said tube toward the discharge end thereof whereby as said rod is advanced through said tube the molten part of said rod will be forced to backflow around said rod and resolidify therearound in a continuously reforming seal between said rod and said gradient tube.

5. An extension apparatus for producing an extruded rod from a fusible rod or wire of substantially uniform cross-sectional area comprising a temperature gradient tube having an internal cross-sectional area greater than the external cross-sectional area of said fusible rod, a die connected to one end of said tube, a discharge orifice in said die in communication with the bore of said tube, said orifice having a cross-sectional area less than the cross-sectional area of said fusible rod, cooling means for cooling said die to a temperature less than the melting point of said fusible rod, heating means for maintaining the end of said tube adjacent said die at a temperature above the melting point of said fusible rod, means for cooling the opposite end of said tube to a temperature below the melting point of said fusible rod, and means for advancing said fusible rod through said tube toward the discharge end thereof whereby as said fusible rod is advanced through said tube the molten part of said fusible rod will be forced to backflow around said fusible rod and resolidify therearound in a continuously reforming seal between said fusible rod and said gradient tube.

(References on following page)

References Cited in the file of this patent

UNITED STATES PATENTS

| | | | |
|---|---|---|---|
| 1,186,773 | Harris | June 13, | 1916 |
| 1,215,693 | Orme | Feb. 13, | 1917 |
| 1,219,358 | Stewart | Mar. 13, | 1917 |
| 1,403,955 | Hill | Jan. 17, | 1922 |
| 2,097,502 | Southgate | Nov. 2, | 1937 |
| 2,253,089 | Nydegger | Aug. 19, | 1941 |
| 2,437,263 | Manning | Mar. 9, | 1948 |
| 2,605,502 | Culpepper et al. | Aug. 5, | 1952 |